(12) United States Patent
Tindal et al.

(10) Patent No.: US 8,769,342 B2
(45) Date of Patent: Jul. 1, 2014

(54) REDIRECTING DATA GENERATED BY NETWORK DEVICES

(75) Inventors: Glen Tindal, Colorado Springs, CO (US); Jeffery A. Schenk, Cambria, CA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/541,808

(22) Filed: Jul. 5, 2012

(65) Prior Publication Data

US 2012/0272102 A1 Oct. 25, 2012

Related U.S. Application Data

(62) Division of application No. 09/730,680, filed on Dec. 6, 2000, now Pat. No. 8,219,662.

(51) Int. Cl.
*G06F 11/00* (2006.01)

(52) U.S. Cl.
USPC .......................... 714/38.1; 714/38.11; 714/45

(58) Field of Classification Search
USPC ........................................ 714/38.1, 38.11, 45
See application file for complete search history.

(56) References Cited

U.S. PATENT DOCUMENTS

| | | | | |
|---|---|---|---|---|
| 5,119,377 A | * | 6/1992 | Cobb et al. | 714/38.11 |
| 5,935,262 A | * | 8/1999 | Barrett et al. | 714/46 |
| 6,202,090 B1 | * | 3/2001 | Simone | 709/220 |
| 6,226,761 B1 | * | 5/2001 | Berstis | 714/37 |
| 6,349,314 B1 | * | 2/2002 | Patel | 1/1 |
| 6,978,301 B2 | | 12/2005 | Tindal | |
| 7,054,946 B2 | | 5/2006 | Tindal et al. | |
| 7,246,162 B2 | | 7/2007 | Tindal | |
| 7,246,163 B2 | | 7/2007 | Tindal | |
| 7,249,170 B2 | | 7/2007 | Tindal et al. | |
| 7,366,893 B2 | | 4/2008 | Tindal et al. | |
| 7,650,396 B2 | | 1/2010 | Tindal | |
| 8,041,786 B2 | | 10/2011 | Tindal et al. | |
| 8,219,662 B2 | | 7/2012 | Tindal et al. | |
| 2002/0069271 A1 | | 6/2002 | Tindal et al. | |
| 2002/0069367 A1 | | 6/2002 | Tindal et al. | |

FOREIGN PATENT DOCUMENTS

| | | |
|---|---|---|
| WO | WO 02/46927 A2 | 6/2002 |
| WO | WO 02/47332 A2 | 6/2002 |

\* cited by examiner

*Primary Examiner* — Charles Ehne
(74) *Attorney, Agent, or Firm* — Stephen J. Walder, Jr.; Jeffrey S. LaBaw

(57) ABSTRACT

A system and method for efficiently and easily capturing data dumps generated by a network device is disclosed. In one embodiment, a storage management device is disposed between a network device and a storage device. The network device is programmed with a virtual address that is associated with the storage management device. Upon generating a data dump, the network device writes the data dump to the virtual address where the storage management device receives the data dump and redirects it to a long-term storage location. Additionally, the storage management device can generate a record of each data dump that indicates the network device that generated the data dump and where the data dump was stored.

26 Claims, 8 Drawing Sheets

US 8,769,342 B2

REDIRECTING DATA GENERATED BY NETWORK DEVICES

This application is a divisional of application Ser. No. 09/730,680, filed Dec. 6, 2000, status awaiting publication.

RELATED APPLICATIONS

The following commonly owned and assigned patent applications are hereby incorporated by reference in their entirety:
1) Patent Application No. CNTW-001/00US, entitled System and Method for Configuration, Management and Monitoring of Network Resources, filed on Dec. 6, 2000;
2) Patent Application No. CNTW-003/00US, entitled Event Manager for Network Operating System, filed on Dec. 6, 2000;
3) Patent Application No. CNTW-004/00US, entitled Dynamic Configuration of Network Devices to Enable Data Transfers, filed on Dec. 6, 2000;
4) Patent Application No. CNTW-005/00US, entitled Network Component Configuration and Management Method, filed on Dec. 6, 2000; and
5) Patent Application No. CNTW-006/00US, entitled Network Operating System Data Directory, filed on Dec. 6, 2000.

FIELD OF THE INVENTION

The present invention relates generally to network systems. More particularly, but not by way of limitation, the present invention relates to systems and methods for capturing data generated by network devices such as routers and optical devices.

BACKGROUND OF THE INVENTION

Data dumps have long been a tool utilized by software and hardware engineers to identify errors within computer systems. For example, core dumps were once used as the primary method for debugging complex computer programs. Improvements in programming languages and the development of interactive debuggers, however, have reduced the use of core dumps for debugging most application programs. Nonetheless, core dumps and the capture of core dumps are still essential for programmers attempting to debug operating systems and other low level programs.

As operating systems become more sophisticated, the need for capturing and analyzing data dumps becomes increasingly more important, both in the general purpose computer environment and in the network device environment. For example, modern routers are configured to generate core dumps when certain errors are encountered or when the routers crash. Network administrators need to capture these core dumps. One solution to capturing core dumps includes hardwiring a write-out address, e.g., a TCP/IP address, in each individual router. Such a solution is employed by Cisco Systems and is illustrated in FIG. 1. In this type of system, when a router (such as router 105) encounters an error, it retrieves the hardwired write-out address from local storage 120 and writes the core dump to that address. Different routers are likely programmed with different hardwired addresses. For example, routers 105 and 110 can be programmed with the address of storage device 125, and router 115 can be programmed with the address of storage device 130. In this type of system, once the core dump is written out by the router 105, 110, 115, the addressed storage device 125, 130 must determine how to handle the incoming data. Often, the core dump is written to the storage device in a haphazard fashion, and the administrator is left to sort through an enormous amount of information.

As the size of networks grows, hardwiring each network device with a write-out address becomes more tedious, cumbersome and error prone. In many networks, hundreds of network devices should initially be configured with the appropriate hardwired write-out address to which core dumps can be written, and these network devices should be reconfigured each time that the associated storage devices are relocated, removed or otherwise altered. Moreover, in an effort to keep track of which network devices write to which storage devices, administrators are often forced to keep some sort of log that should be updated anytime that the configuration of the relevant storage devices is changed. That is, the log must be updated when storage devices are relocated, removed, added, etc.

The difficulties in managing these hardwired write-out addresses have become so staggering that many network administrators do not even initially configure the addresses and thereby sacrifice the ability to capture core dumps. Unfortunately, because network devices and their operating systems are becoming increasingly more sophisticated, failing to capture core dumps is no longer a viable option available to the network administrator. Accordingly, the network community has been scrambling to find solutions for efficiently capturing core dumps.

An alternate solution for capturing core dumps has been developed by Juniper Networks Inc. Juniper has designed routers with onboard, i.e., integrated, storage for recording core dumps. This basic configuration is illustrated in FIG. 2 wherein multiple routers 135 in the same network are each configured with their own integrated storage 140. Any core dump or other data dump generated by these routers 135 is written directly to the attached integrated storage 140 rather than to a hardwired write-out address. Thus, network administrators using this type of router do not need to configure each network device with a hardwired write-out address.

Although Juniper has solved some of the problems associated with hardwiring each network device with a write-out address, Juniper's solution introduces an entire new set of problems. For example, integrating storage directly into each router significantly increases the cost of each device. Additionally, by integrating storage directly into the router, the physical size of the router is increased. In fact, Juniper routers require a significantly larger amount of valuable rack space than a comparable router that does not include the integrated storage.

Even though Juniper's solution to capturing data dumps is plagued by significant problems, network administrators have been receptive to its solution for lack of a better option. Accordingly, the network community is in immediate need of a better option. In particular, the network community is in need of a system and method for efficiently and easily capturing data dumps generated by network devices.

SUMMARY OF THE INVENTION

To remedy the above described and other deficiencies of the current technology, a system and method for efficiently and easily capturing data dumps from network devices is disclosed. In one embodiment, the present invention includes a storage management device disposed between a network device and a storage device. The network device is programmed with a virtual address—associated with the storage management device—to which a data dump generated by that network device can be written. Because the virtual address can be mapped to the physical location of the storage management device, each network device within the relevant network can be configured to write to that virtual address rather than to a hardwired address that corresponds to a storage device. By simply remapping the virtual address to a new physical address, the storage management unit can be moved from one physical point on the network to another physical point on the network without updating the virtual address stored in the network devices.

Furthermore, the storage manager can be programmed with the addresses for those storage devices to which a data dump can be redirected. In this embodiment, upon receiving a data dump, the storage manager can redirect or otherwise transfer the data to one of those storage devices. Thus, the network devices never necessarily need to know the actual addresses for the storage devices that will store the data dump. In other embodiments, the storage manager can keep a record of each network device that generates a data dump and the location at which each data dump is stored. Network administrators can search a compilation of these records to locate the data dumps.

Accordingly, the present invention overcomes the problems with the present technology and addresses the needs of the network community. The above-described embodiments as well as other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
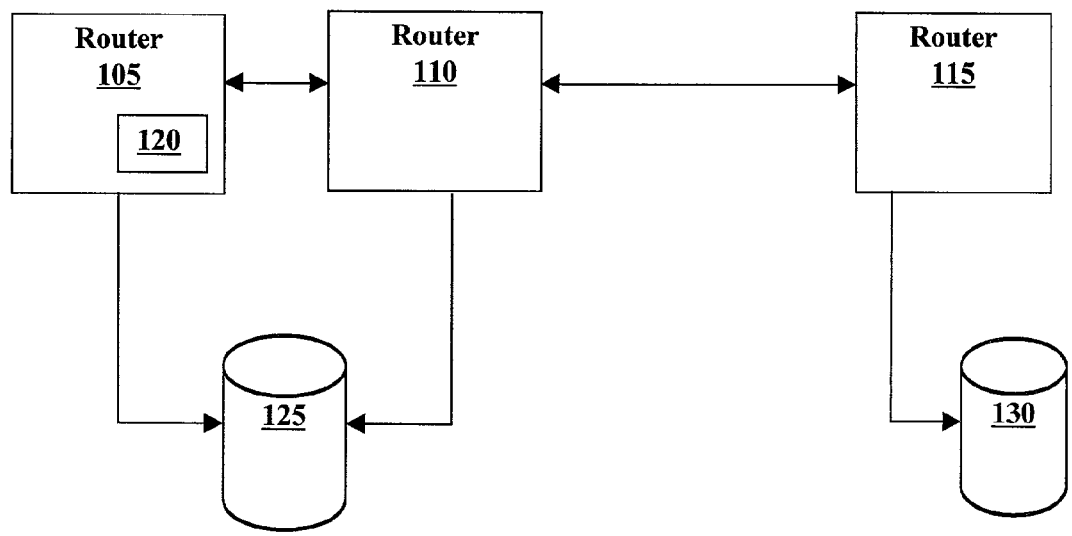
FIG. 1 illustrates a present network system that includes routers with hardwired write-out addresses.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalents and alternative constructions that fall within the spirit and scope of the invention as expressed in the claims.

Figure 3:
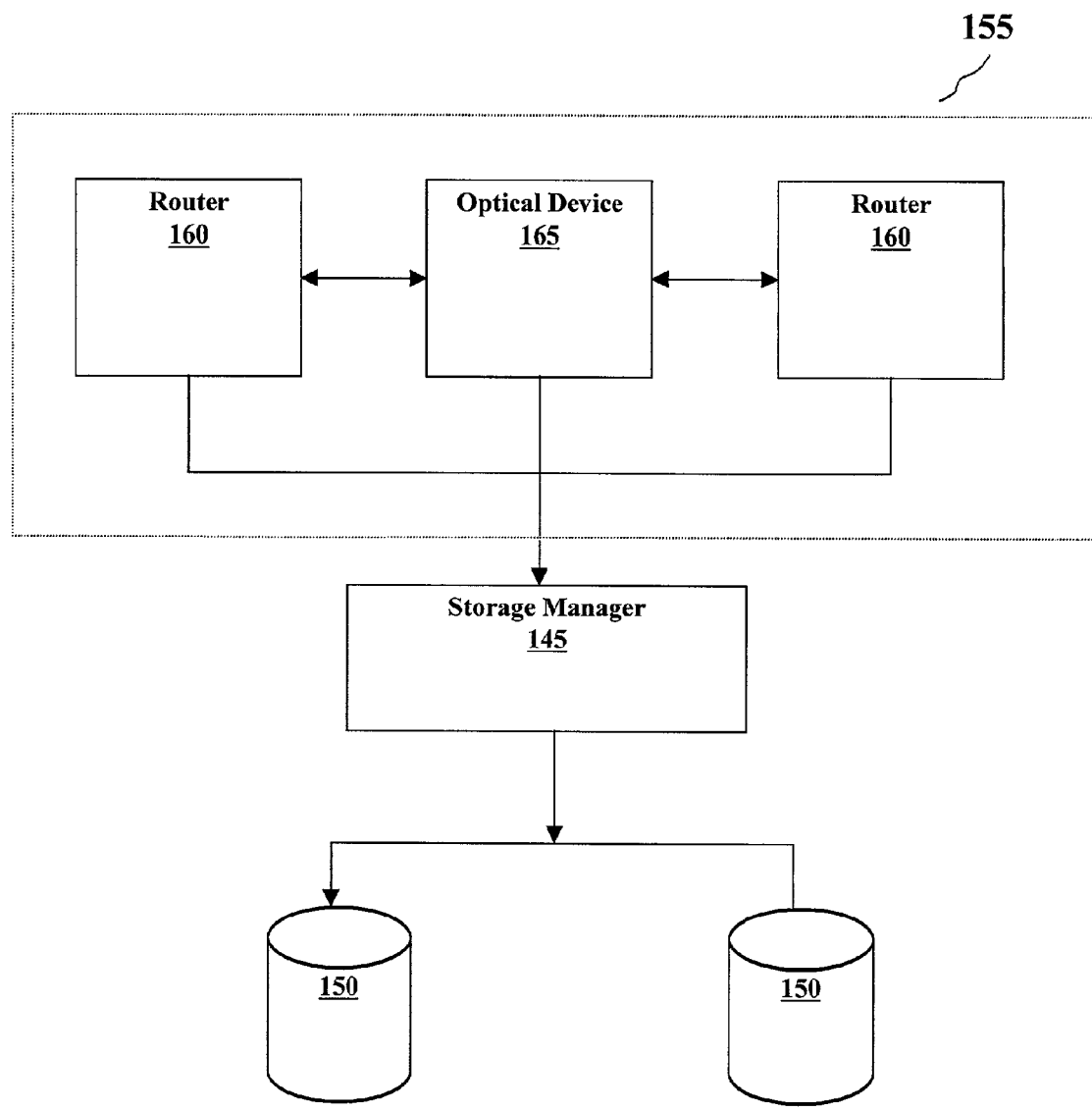
FIG. 3 illustrates a network system constructed in accordance with the principles of the present invention.

Referring now to FIG. 3, there is illustrated a network system constructed in accordance with the principles of the present invention. In this embodiment, a storage manager 145 is disposed between storage devices 150 and network devices 155 (comprised of routers 160 and optical device 165). Each of the network devices 155 can be configured to write a data dump to a virtual data dump address that corresponds to the storage manager 145. For example, each of the network devices 155 could be programmed with a domain name to which a data dump could be written. As is well known to those of skill in the art, this domain name can be mapped to an actual physical address such as an IP address. Accordingly, when the storage manager 145 is moved from one physical address to another physical address, the data dump address that is stored in the various network devices 155 does not necessarily need to be changed. Rather, the mapping between the virtual address and the new physical address should be updated.

Still referring to FIG. 3, the storage manager 145 can be programmed with the addresses of available storage devices 150 to which data dumps can be written. (For the purpose of this application, data dumps can include core dump information, system information, event logs, web site content, customer information, application programs, etc.) For any data dump received from a network device 155, the storage manager 145 can redirect that data dump to one of these available storage devices 150. Although the storage devices are shown directly connected to the storage manager 145, one skilled in the art can understand that the storage devices 150 can be distributed across a network (not shown). In such an embodiment, the storage manager 145 can be programmed with the network address, e.g., the IP address, of the actual storage devices 150. In other embodiments, however, the storage devices 150 can be directly attached to the storage manager 145 or attached through a local network (not shown).

The benefits of the system such as the one illustrated in FIG. 3 are quite substantial. For example, the network administrator can merely configure all network devices 155 (or some portion thereof) to write a data dump to the same virtual address. There is no need to configure each network device 155 with its own hardwired write-out address. Moreover, the administrator does not need to maintain a complicated log indicating which router writes to which storage device. Additionally, the reconfiguration of the network system to account for added, removed, or relocated storage becomes trivial. Instead of reconfiguring scores of network devices 155 when storage is added, removed or relocated, the network administrator need only make a change to the storage manager 145 indicating what storage is now available and where that storage is located. Further, by recording the location of the data dump in association with a network device identifier, a network administrator can locate data dumps for particular network devices with relative ease as compared to present systems.

Figure 2:
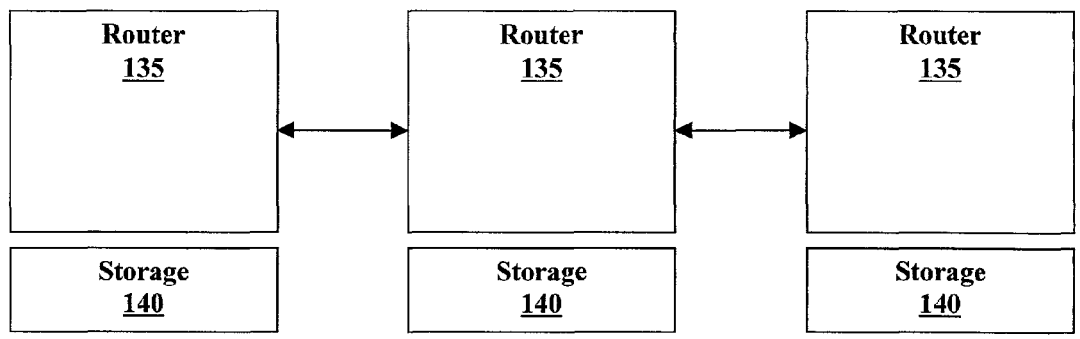
FIG. 2 illustrates a present network system that includes routers with integrated storage for capturing data dumps.

The present invention also provides significant benefits over network devices with integrated storage (element 135 in FIG. 2). For example, with the present invention, storage for data dumps does not need to be integrated with each individual network device. This results in the present invention realizing significant cost savings and size reduction over those systems with integrated storage. Moreover, the present invention offers better management of data dumps because of a more centralized data dump storage environment.

Figure 4:
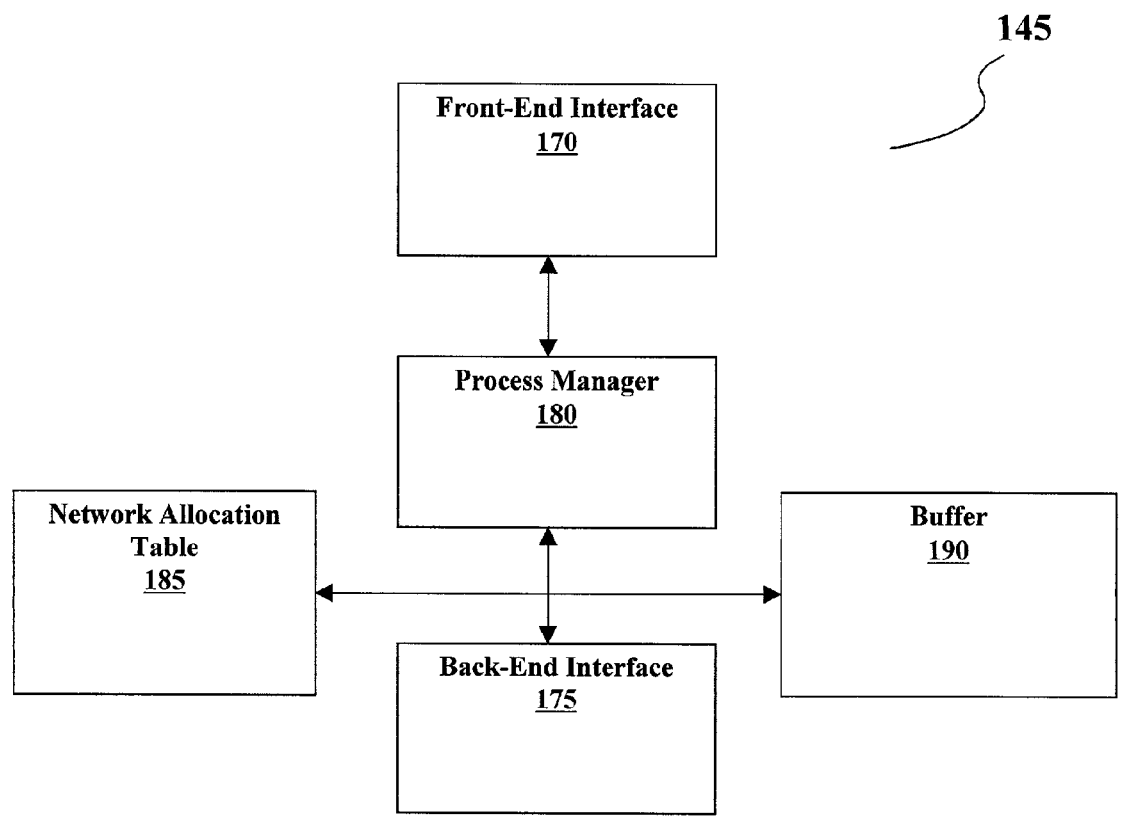
FIG. 4 illustrates in more detail the storage manager component illustrated in FIG. 3.

Referring now to FIG. 4, there is illustrated in more detail the storage manager 145 shown in FIG. 3. This embodiment of the storage manager 145 includes a front-end interface 170 for communicating with an attached network (not shown) and a back-end interface 175 for communicating with storage devices 150 (shown in FIG. 3). The front-end interface 170, for example, can communicate using any one of a number of communication protocols such as FTP, TFTP and HTTP.

Similarly, the back-end interface 175 can communicate with the storage devices 150 in a variety of ways. For example, if a storage device 150 can interpret FTP, TFTP and/or HTTP, the back-end interface 175 can communicate using one of those protocols. Alternatively, the back-end interface 175 can communicate using, for example, fiber channel over IP in which fiber channel transmissions are wrapped in an IP protocol.

In addition to the front-end 170 and back-end interfaces 175, the storage manager 145 can include a process manager 180 that monitors for incoming data dumps and determines how to best redirect those data dumps. The process manager 180 can include a microprocessor (not shown) configured to run a daemon that continuously monitors for transmissions received at the front-end interface 170. Once the process manager determines that a data dump is being received at the front-end interface 170, the process manager 180 can then determine how to handle the incoming transmission. For example, the process manager 180 can determine to which associated storage device 150 (shown in FIG. 3) the data dump should be redirected. Alternatively, the process manager 180 could determine that the data dump should be buffered prior to redirecting it to the appropriate storage device 150.

In determining how to route an incoming data dump, the process manager 180 can access the network allocation table 185 that stores entries about the storage devices 150 (shown in FIG. 3) to which data dumps can be written. In one embodiment, the network allocation table 185 stores addresses, e.g., IP addresses, and indications of which blocks are free within those storage devices 150. Thus, the process manager 180 can quickly access the network allocation table 185 and locate available storage to which a data dump should be redirected.

In further embodiments, the process manager can cause an entry to be created in the network allocation table 185 each time a core dump is received. Such an entry could indicate from which network device 135 (shown in FIG. 3) the core dump is received and the address of the storage device 150 (shown in FIG. 3) to which the data dump was redirected. These entries could be accessed and searched by an administrator so that the administrator can locate the storage location of any data dump.

Still referring to FIG. 4, permanent storage may be temporarily unavailable when a data dump is received or portions of the data dump may be received before the process manager 180 can determine to which storage device 150 (shown in FIG. 3) the data dump should be redirected. In either of these cases, the data dump can be temporarily stored in the buffer 190, and after the process manager 180 determines to which storage device 150 the data dump should be written and that that device is ready to receive the data dump, the contents of the buffer 190 can be transferred. In other embodiments, however, the data dump can be redirected without buffering it within the storage manager 145.

Figure 5:
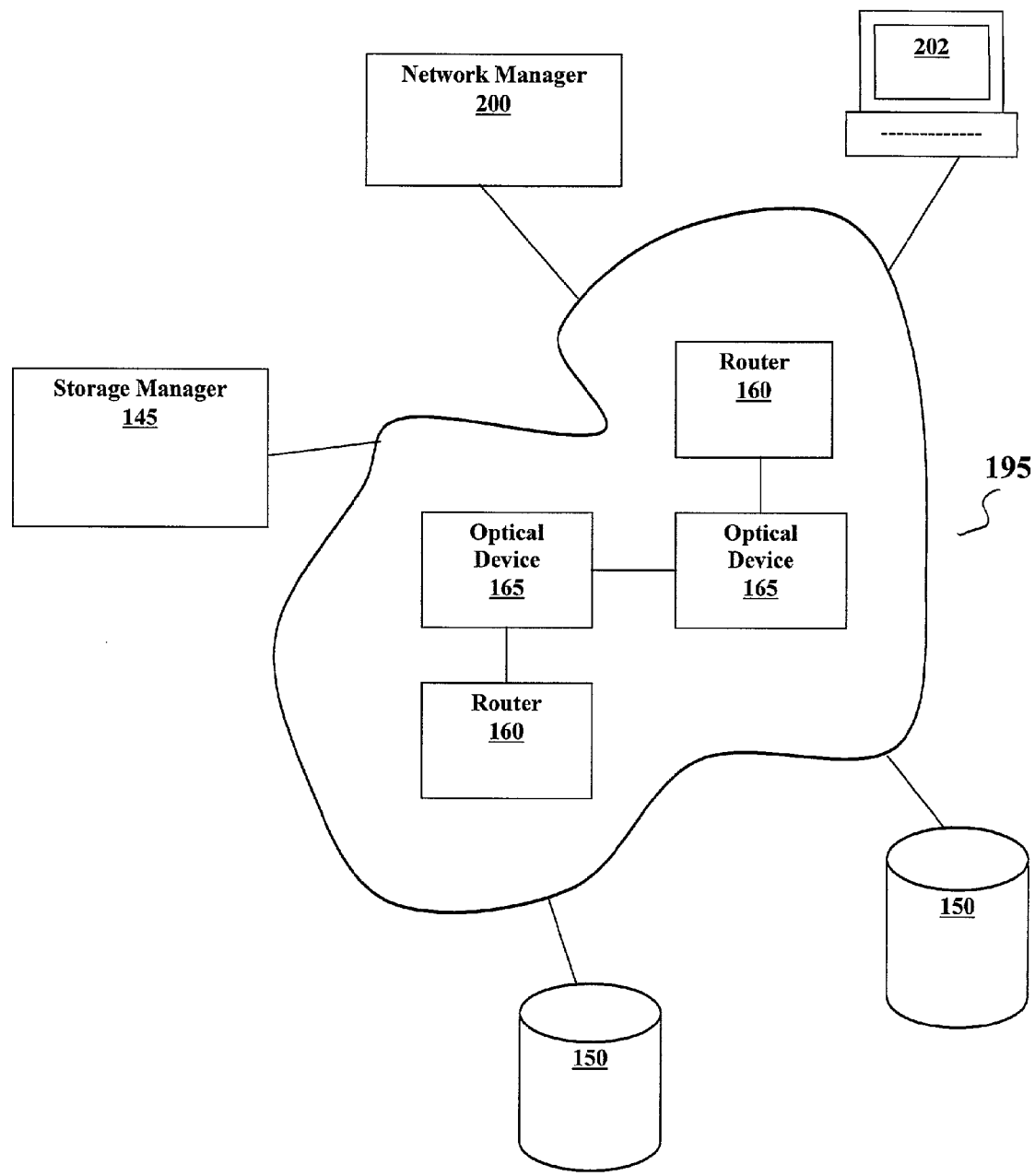
FIG. 5 illustrates an alternate embodiment of the present invention.

Referring now to FIG. 5, there is illustrated an alternate embodiment of the present invention. In this embodiment a storage manager 145 is connected to a network 195 that includes routers 160 and optical devices 165. Two storage devices 150 are also connected to the network 195.

Upon receiving a data dump from a network device 160, 165, the storage manager 145 can generate a message indicating the receipt of the data dump and transmit that message to a network manager 200. (The network manager 200 can be integrated with the storage manager 145 to form a single device.) Such a message would generally indicate the identity of the network device 160, 165 that generated the data dump and the identity of the storage device 150 to which the data dump was redirected. In particular, such a message could indicate the name of the network device 160, 165 generating the data dump, the address of the storage device 150 to which the data dump was written and a particular block within that storage device 150 at which the data dump has been stored.

After receiving a data dump message from the storage manager 145, the network manager 200 can initiate a set of predetermined actions. In fact, a network administrator 202 can configure the network manager 200 to perform virtually any action in response to receiving a message about a data dump. (The network manager 200 is described in detail in commonly owned and assigned patent application no. CNTW-005/00US entitled Network Component Configuration and Management Method, filed on Dec. 6, 2000, which is incorporated herein by reference.)

Figure 6:
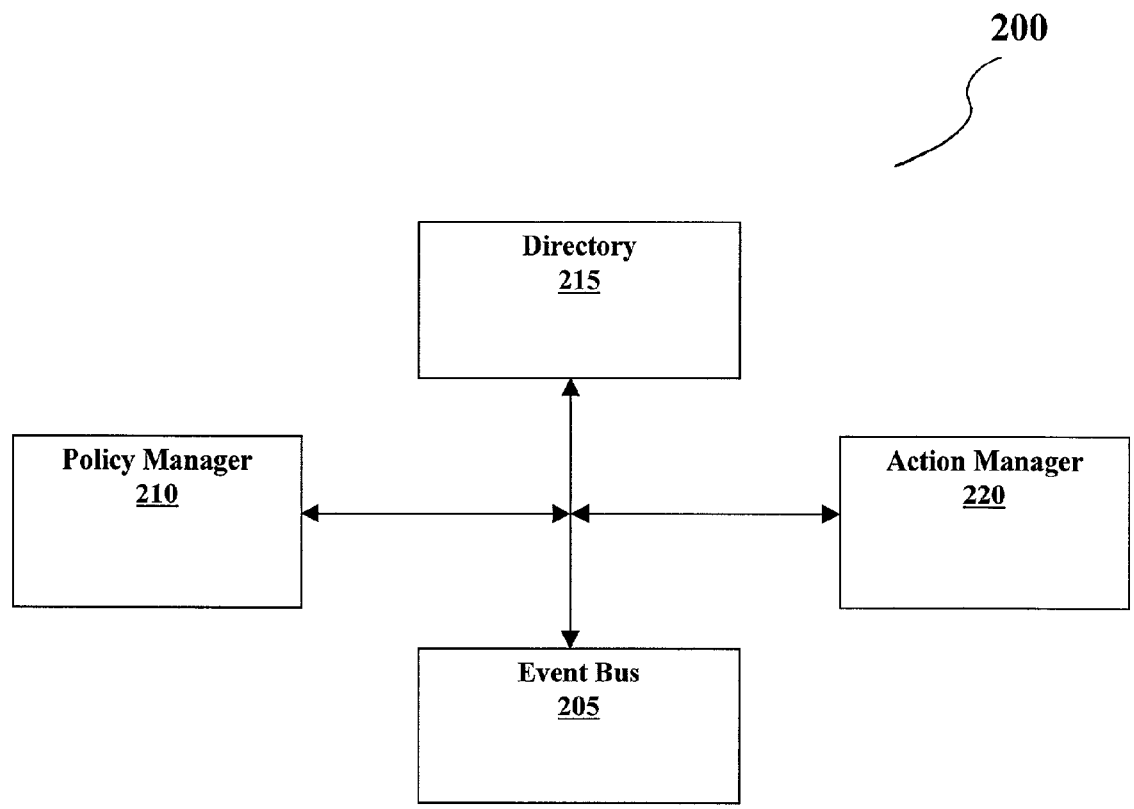
FIG. 6 illustrates in more detail the network manager component of FIG. 5.

Referring now to FIG. 6, there is illustrated in more detail the network manager 200 of FIG. 5. In this embodiment, the network manager includes an event bus 205 connected with a policy manager 210, a directory 215 and an action manager 220. The event bus 205 can receive data dump messages generated by the storage manager 145 (shown in FIG. 5) and/or individual network devices 160, 165 (also shown in FIG. 5). When a data dump message is placed on the event bus 205, that message can be compared against pre-established rules stored in the policy manager 210 to determine a proper response to the data dump message. Once the proper response is determined, that response is posted to the event bus 205 as a work order. This work order can then be retrieved from the event bus 205 by the action manager 220 and subsequently executed. For example, the rules stored in the policy manager 210 might indicate that a particular router is to be taken offline if it generates a core dump. Thus, when a message is placed on the event bus 205 indicating that that particular router has generated a core dump, the rule taking that router offline is retrieved from the policy manager 210, placed on the event bus 205 and executed by the action manager 220.

Figure 7:
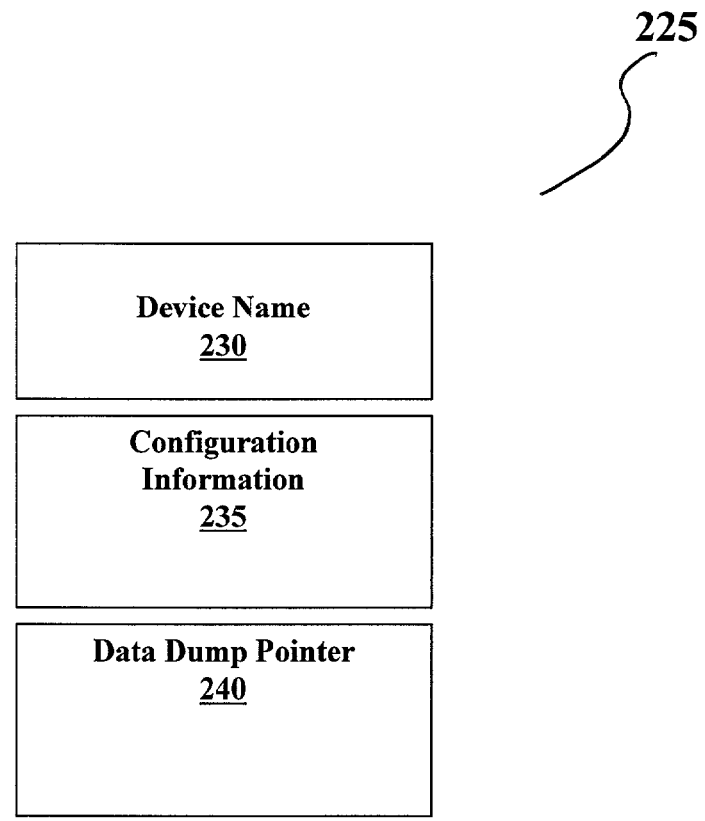
FIG. 7 illustrates an exemplary configuration record that can be stored in the directory of FIG. 6.

In further embodiments, the storage location of a data dump can be stored in a configuration record associated with the network device that generated the data dump. This configuration record along with the configuration records for the other network devices can be stored in the directory 215, which includes a central repository for storing configuration records for each of the network devices 160, 165 (shown in FIG. 5). An exemplary configuration record 225 is shown in FIG. 7. Such a record 225 could exist for each network device 160, 165, and could indicate a device's name 230 and its basic configuration information 235. Additionally, the configuration record 225 could also include a data dump pointer field 240 that stores a pointer to the storage location of any data dump generated by the particular network device associated with the configuration record. The data dump pointer field 250 could be populated with the storage device address received with a data dump message.

Figure 8:
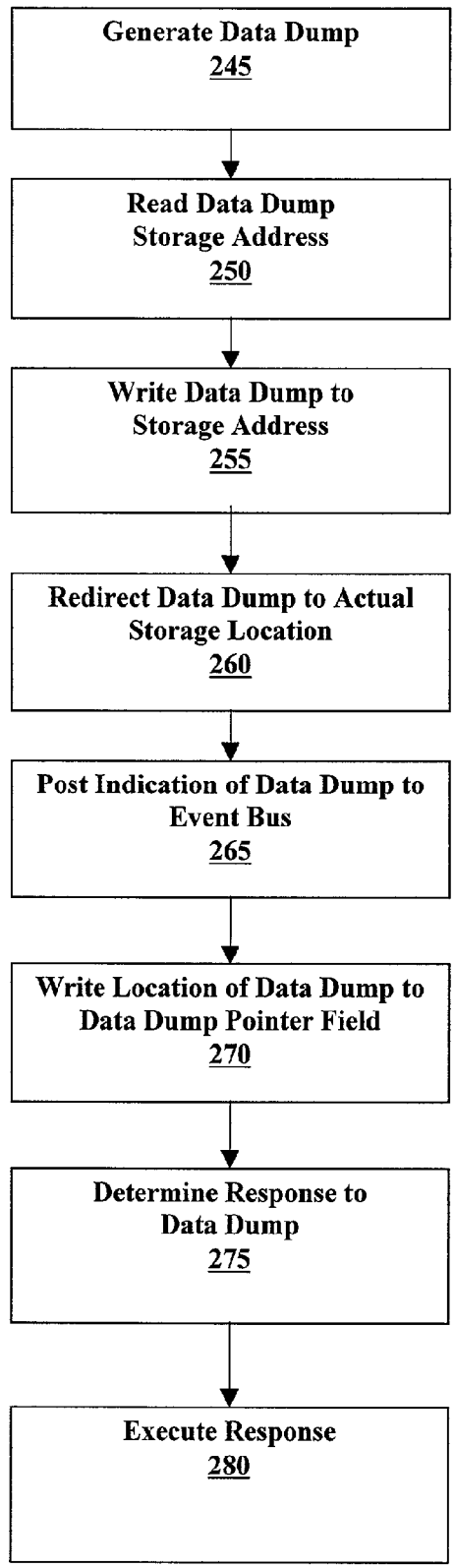
FIG. 8 is a flow chart of one method for capturing a data dump.

Referring now to FIG. 8, there is illustrated one method of capturing a data dump in accordance with the principles of the present invention. In this method, a particular network device 160, 165 (shown in FIG. 5) would generate a data dump (step 245) and determine the address, e.g., the virtual address, to which that data dump should be written (step 250). Next, the network device 160, 165 would actually write that data dump to the data dump address (step 255), which can correspond to the address of the storage manager 145 (shown in FIG. 5). Although in the presently preferred embodiment, the data dump address is a virtual address pointing to the storage manager 145, one skilled in the art could easily configure the data dump storage address to include an IP address.

Once the network device 160, 165 has written out the data dump to the virtual address, the storage manager 145 redirects that data to an associated storage device 150 (all shown in FIG. 5) (step 260). Next, the storage manager 145 posts a message regarding the data dump to the event bus 205 (shown in FIG. 6) of the network manager 200 (step 265). Once the message is received at the network manager 200, the storage location of the data dump can be written to the data dump pointer field 240 of the appropriate configuration record 225 (shown in FIG. 7) (step 270). Next, the network manager 200 can determine the proper response for dealing with the data dump generated by the particular network device 160, 165 (step 275), and once the proper response is determined, implement that response (step 280).

In conclusion, the present system provides, among other things, a system and method for efficiently and easily capturing data dumps generated by network devices. Moreover, the present system provides a system and method for automatically responding to a data dump. Those skilled in the art, however, can readily recognize that numerous variations and substitutions may be made to the invention, its use and its configuration to achieve substantially the same result as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for capturing error data generated by network device, the system comprising:
   an interface connectable to the network device, the interface being configured to receive, at a location remote from the network device, the error data generated by the network device;
   a process manager coupled to the interface, the process manager being configured to transfer the received error data to a first storage device; and
   a second storage device coupled to the process manager, the second storage device configured to store an allocation table.

2. The system of claim 1, wherein the allocation table comprises a network allocation table.

3. The system of claim 1, wherein the second storage device is configured to store the address of the first storage device and wherein the process manager is configured to access the second storage device and retrieve the address of the first storage device prior to transferring the received error data.

4. The system of claim 1, further comprising:
   a buffer coupled to the interface, the buffer being configured for storing the error data received by the interface.

5. The system of claim 1, wherein the process manager comprises:
   a daemon.

6. The system of claim 1, wherein the process manager is further configured to write an entry to the allocation table indicating an identity for the network device that generated the error data and the identity of the first storage device.

7. The system of claim 1, further comprising:
   a directory in communication with the process manager, the directory configured to store a configuration record unique to the network device.

8. The system of claim 1, further comprising:
   the first storage device coupled to the interface, the first storage device configured to store the transferred error data.

9. A system for capturing error data generated by a network device, the system comprising:
   an interface connectable to the network device, the interface configured to receive the error data generated by the network device;
   a process manager coupled to the interface, the process manager configured to transfer the received error data to a first storage device; and
   a second storage device coupled to the process manager, the second storage device configured to store an allocation table.

10. The system of claim 9, wherein the allocation table comprises a network allocation table.

11. The system of claim 9, wherein the second storage device is configured to store the address of the first storage device and wherein the process manager is configured to access the second storage device and retrieve the address of the first storage device prior to transferring the received error data.

12. The system of claim 9, further comprising:
   a buffer coupled to the interface, the buffer for storing the error data received by the interface.

13. The system of claim 9, wherein the process manager comprises:
   a daemon.

14. The system of claim 9, wherein the process manager is further configured to write an entry to the allocation table indicating an identity for the network device that generated the error data and the identity of the first storage device.

15. The system of claim 9, further comprising:
   a directory in communication with the process manager, the directory configured to store a configuration record unique to the network device.

16. The system of claim 9, further comprising:
   the first storage device coupled to the interface, the first storage device configured to store the transferred error data.

17. A system for capturing error data generated by a network device, the system comprising:
   at least a first processor configured to generate instructions;
   at least a first memory device connected to the processor;
   a plurality of instructions stored on the memory device, the plurality of instructions configured to cause the at least a first processor to perform the steps of:
      receiving the error data from the network device;
      recording an identity indicator for the network device from which the error data was received;
      transferring the received error data to a storage device; and
      recording the identity of the storage device to which the error data was redirected, wherein the identity of the storage device is recorded in association with the recorded identity indicator for the network device, and wherein the plurality of instructions are further configured to cause the at least a first processor to perform the step of writing the error data to a virtual address.

18. The system of claim 17, wherein the plurality of instructions are further configured to cause the at least a first processor to perform the step of:
   reading the virtual address from a memory associated with the network device.

19. The system of claim 17, wherein the plurality of instructions are further configured to cause the at least a first processor to perform the step of:
   storing the received error data in the storage device.

20. The system of claim 17, wherein the plurality of instructions are further configured to cause the at least a first processor to perform the step of:
   recording the identity indicator for the network device in a configuration record that is unique to the network device.

21. The system of claim 17, wherein the configuration record is stored remotely from the network device.

22. The system of claim 17, wherein the plurality of instructions are configured to cause the at least a first processor to perform the steps of redirecting by:
   transferring the received error data to a remote storage device.

23. The system of claim 17, wherein the plurality of instructions are further configured to cause the at least a first processor to perform the step of:
   posting an error data indicator to a network manager.

24. The system of claim 17, wherein the plurality of instructions are further configured to cause the at least a first processor to perform the steps of posting an error data indicator by:
   posting the identity indicator to the network manager; and
   posting the identity of the storage device to the network manager.

25. The system of claim 17 wherein the plurality of instructions are further configured to cause the at least a first processor to perform the step of:
   executing a predefined action responsive to the error data indicator being posted to the network manager.

26. The system of claim 17, wherein the plurality of instructions are configured to cause at least a first processor to perform the step of transferring by:
   redirecting the received error data.

* * * * *